United States Patent [19]

Worsely

[11] Patent Number: 4,491,720
[45] Date of Patent: Jan. 1, 1985

[54] AUTOMATIC WELDING CONTROL SYSTEM WITH SELECTABLE PAIRS OF ALTERNATE OUTPUT TERMINALS

[75] Inventor: Paul A. Worsely, Medway, Mass.

[73] Assignee: Suburban Welders Supply Co., Inc., Ashland, Mass.

[21] Appl. No.: 519,081

[22] Filed: Aug. 1, 1983

[51] Int. Cl.³ .............................................. B23K 9/00
[52] U.S. Cl. .................. 219/136; 219/137.2; 361/166
[58] Field of Search ............. 219/136, 137 PS, 130.5, 219/137.7, 137.2; 361/166

[56] References Cited

U.S. PATENT DOCUMENTS

| | | | |
|---|---|---|---|
| 2,832,000 | 4/1958 | Steele | 219/137 PS |
| 3,118,051 | 1/1964 | Dixon | 219/137 PS |
| 3,581,050 | 5/1971 | Brown | 219/137.7 |
| 3,581,051 | 5/1971 | Brown | 219/130.5 |
| 4,144,552 | 3/1979 | Sibalis | 361/166 |

Primary Examiner—Clifford C. Shaw
Attorney, Agent, or Firm—John E. Toupal; Harold G. Jarcho

[57] ABSTRACT

A welding control system including first and second pairs of gas supply output terminals, first and second pairs of contactor output terminals, first and second pairs of wire feed output terminals, normally open gas supply switch contacts connected across the second pair of gas supply output terminals, normally open contactor switch contacts connected across the second pair of contactor output terminals, normally open wire feed switch contacts connected across the second pair of wire feed output terminals and input terminals for connection to a voltage supply. A control circuit selectively connects the input terminals across the first pairs of output terminals and selectively closes the normally open switch contacts.

19 Claims, 2 Drawing Figures

AUTOMATIC WELDING CONTROL SYSTEM WITH SELECTABLE PAIRS OF ALTERNATE OUTPUT TERMINALS

BACKGROUND OF THE INVENTION

This invention relates generally to a welding control system and, more particularly to an automatic control system for gas metal arc welding (GMAW).

GMAW welding is a well known process in which a shielding gas is used to isolate a workpiece being welded from the surrounding atmosphere. Equipment typically used in the MIG process includes shielding gas supplies, welding wire feeders, welding power sources, electrically controlled welding electrodes, and fixtures for positioning a workpiece being welded. In many applications, electrical circuits are provided for automatically controlling the various components in a welding system. The provision of automatic controls, however, is complicated by the fact that different manufacturers of welding equipment employ dissimilar means of activation. In most instances activation of the equipment requires either the application of supply voltage or the closure of a pair of switch contacts. Since a typical welding system will consist of individual welding components from a variety of sources, an automatic control system must be individually tailored to each specific welding system. Obviously the design and production of such specialized automatic control systems is expensive and adds considerably to the overall costs of a welding operation.

The object of this invention, therefore, is to provide an automatic welding control system that is universally applicable to welding systems incorporating individual welding components from plural sources.

SUMMARY OF THE INVENTION

The invention is a welding control system including first and second pairs of gas supply output terminals, first and second pairs of contactor output terminals, first and second pairs of wire feed output terminals, normally open gas supply switch contacts connected across the second pair of gas supply output terminals, normally open contactor switch contacts connected across the second pair of contactor output terminals, normally open wire feed switch contacts connected across the second pair of wire feed output terminals and input terminals for connection to a voltage supply. A control circuit selectively connects the input terminals across the first pairs of output terminals and selectively closes the normally open switch contacts. By appropriate interconnection of the control systems output terminals with the input terminals of welding equipment, a wide variety of distinct welding systems can be accommodated.

According to one feature of the invention, the control circuit includes a gas supply relay for both connecting the input terminals across the first pair of gas supply output terminals and closing the normally open gas supply switch contacts, a contactor relay for both connecting the input terminals across the first pair of contactor output terminals and closing the normally open contactor switch contacts and a wire feed relay for both connecting the input terminals across the first pair of wire feed output terminals and closing the normally open wire feed switch contacts. The use of individual relays each controlling two sets of output terminals provides at relatively low cost the desired universally applicable and selective output control functions.

According to another feature of the invention, the control circuit includes an activatable start up mechanism for energizing the relays and a purge timer for delaying energization of the contactor and wire feed relays for a predetermined period after energization of the gas supply relay. The purge timer provides predetermined purge periods during which the welding zone is purged prior to initiation of welding activity.

According to still another feature of the invention, the control circuit includes a process timer for automatically deenergizing the relays within a given period after activation of the start up mechanism. Preferably, the process timer includes a weld timer for deenergizing the gas supply and wire feed relays a fixed period after activation of the start up mechanism and a burn back timer for maintaining energization of the contactor relay for a limited period thereafter. The continued energization of the contactor relay for a limited period after deenergization of the gas supply and wire feed relays ensures that any exposed welding wire remnant will be consumed prior to the initiation of a subsequent welding operation.

According to yet another feature of the invention, the control circuit includes a manually operated wire feed switch means for selectively energizing the wire feed relay. The wire feed switch permits an operator to independently control ejection of welding wire from the wire feeder when desired.

According to yet another feature of the invention, the control circuit includes a manually operated purge switch for selectively energizing the gas supply relay. Actuation of the purge switch permits an operator to establish purge periods of desired length for specific applications.

According to yet another feature of the invention, the control circuit further includes a manually operated burn back switch for selectively deactivating the burn back timer. By activating the burn back switch, an operator can supersede the burn back function of the control system when desired.

In a preferred embodiment of the invention, the control system also includes first and second pairs of fixture feed output terminals and normally open fixture feed switch contacts connected across the second pair thereof, and the control circuit selectively connects the input terminals across the first pair of fixture feed output terminals and closes the fixture feed switch contacts. Preferably, the control circuit includes a fixture feed relay that can be energized both to connect the input terminals across the first pair of fixture feed output terminals and to close the fixture feed switch contacts. The fixture feed relay permits the control system to automatically control the physical positioning of a workpiece during welding operations.

According to yet another feature of the invention, the control circuit includes a manually operated fixture feed switch for selectively energizing and deenergizing the fixture feed relay simultaneously with the wire feed and contactor relays. In this arrangement, the controlled movement of the workpiece coincides with activation of the welding wire feeder and welding electrode.

According to another feature of the invention, the control circuit includes a manually operated fixture feed switch for selectively energizing and deenergizing the fixture feed relay simultaneously with the gas supply relay. In systems employing an initial purge period, this arrangement provides for a running start of the workpiece fixture.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
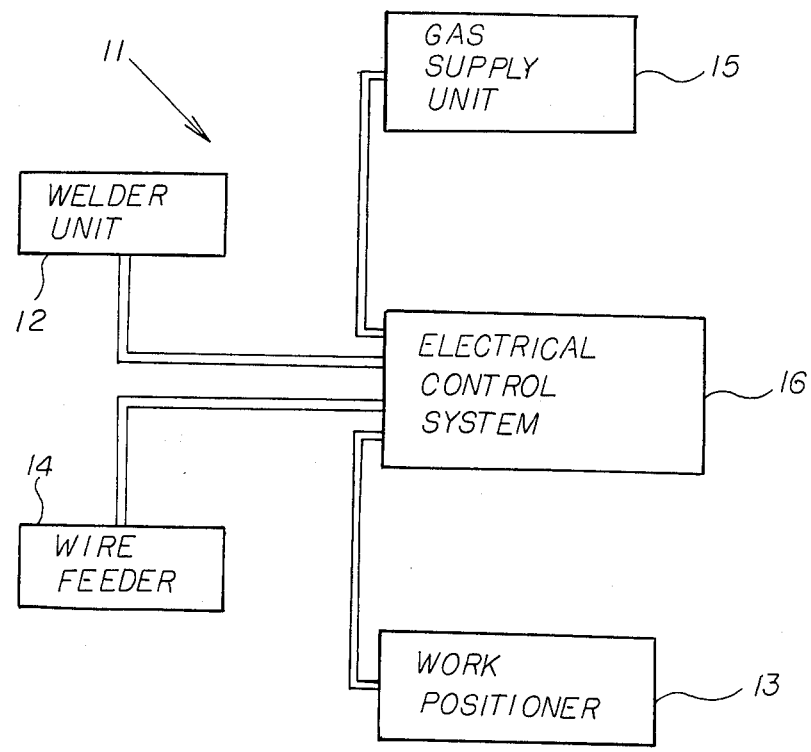
FIG. 1 is a schematic block diagram depicting a welding system according to the invention.

The block diagram of FIG. 1 illustrates a GMAW welding system 11 according to the present invention. A welder unit 12 functions in the conventional manner to create welds on a workpiece automatically positioned by a work positioner 13. During the welding process, welding wire is supplied by a wire feeder 14 and inert gas is discharged by a gas supply unit 15. Interconnected with the welder unit 12, the work positioner 13, the wire feeder 14 and the gas supply unit 15 is a control system 16. As described hereinafter, the control system 16 is functionally compatible with diverse welding system equipment and automatically controls their operation during the welding process.

Figure 2:
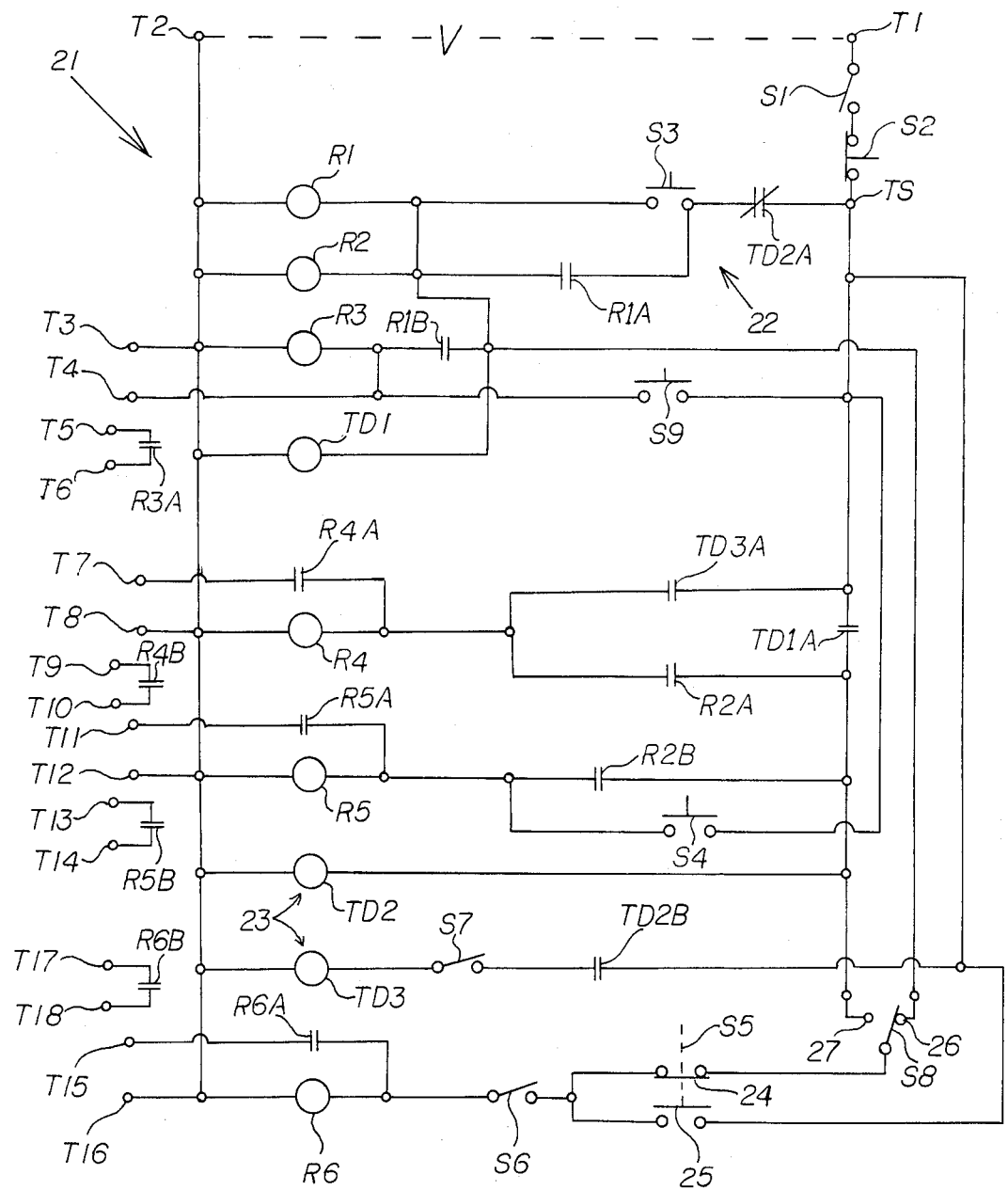
FIG. 2 is a schematic circuit diagram of the welding control system shown in FIG. 1.

Referring now to FIG. 2 there is schematically illustrated an electrical control circuit 21 of the electrical control system 16 shown in FIG. 1. Ihe control circuit 21 includes input terminals T1, T2 for connection to a suitable voltage supply of, for example, 115V AC. Also included in the circuit 21 are a first pair of gas supply output terminals T3, T4 and a second pair of gas supply output terminals T5, T6 that are selectively and alternatively connectable to an activation solenoid (not shown) in the gas supply unit 15; a first pair of contactor output terminals T7, T8 and a second pair of contactor terminals T9, T9 selectively and alternatively connectable to an electrical contactor (not shown) in the welder unit 12; a first pair of wire feed output terminals T11, T12 and a second pair of wire feed output terminals T13, T14 selectively and alternatively connectable to input terminals of the wire feeder 14; and a first pair of fixture feed output terminals T17, T16 and a second pair of fixture feed output terminals T17, T18 selectively and alternatively connectable to input terminals of the work positioner 13. The input terminal T1 is connected to a power terminal TS by an on-off switch S1 and a normally closed momentary stop switch S2. Connecting start up relay windings R1, R2 between the input terminal T2 and the power terminal TS is a connector circuit 22 including normally closed relay contacts TD2A and the parallel combination of a normally open momentary start-up switch S3 and normally open relay contacts R1A responsive to the relay winding R1. Connecting a gas supply relay winding R3 between the input terminal T2 and the connector circuit 22 are normally open relay contacts R1B also responsive to the relay winding R1 and a gas purge timer TD1 is connected directly therebetween. The gas supply output terminal T4 also is connected to the power terminal TS by the connector circuit 22 and the contacts R1B while the gas supply output terminal T3 is connected directly to the input terminal T2.

A contactor relay winding R4 is connected between the input terminal T2 and the power terminal TS by either normally open contacts TD3A and a series combination of normally open contacts R2A responsive to the start-up relay R2 and normally open contacts TD1A responsive to the gas purge timer TD1. The contacts TD3A, R2A and TD1A also connect the contactor output terminal T7 to the power terminal TS via the normally open contacts R4A responsive to the contactor relay winding R4 while the contactor output terminal T8 is connected directly to the input terminal T2.

A wire feed relay winding R5 is connected between the input terminal T2 and the supply terminal TS by either a normally open, manually operated wire feed momentary switch S4 or the series combination of the contacts TD1A and the normally open contacts R2D responsive to the start-up relay winding R2. Also connected between the input terminal T2 and the supply terminal TS by the contacts TD1A is a weld timer TD2. Responsive to the wire feed relay winding R5 are contacts R5A that connect the wire feed output terminal T11 to the supply terminal TS via either the wire feed switch S4 or the series connected contacts R2B and TD1A while the wire feed output terminal T12 is connected directly to the input terminal T2.

A fixture feed relay winding R6 is connected by a fixture feed on-off switch S6 and normally closed contacts 24 of a manually operated fixture jog momentary switch S5 between the input terminal T2 and either the connector circuit 22 by contacts 26 of a manually operated fixture feed switch S8 or to the supply terminal TS by contacts 27 of the switch S8 and the contacts TD1A. Ihe fixture feed relay winding R6 can also be connected directly to the supply terminal TS by the on-off switch S6 and normally open contacts 25 of the fixture jog momentary switch S5. Connecting the fixture feed output terminal T15 to the supply terminal TS are also the switches S5, S6 and S8 and the contacts R6A responsive to the fixture feed relay winding R6. The fixture feed output terminal T16 is connected directly to the input terminal T2. A burn back timer TD3 that controls the contacts TD3A is connected between the input terminal T2 and the supply terminal TS by a manually operated burn back on-off switch S7 and time delay contacts TD2B responsive to the weld timer TD2. Together the weld timer TD2 and the burn-back timer TD3 comprise a process timer circuit 23 that controls the complete length of a welding operation. A manually operated normally open momentary purge switch S9 is connected between the supply terminal TS and the gas supply relay winding R3.

Connected across the second pair of gas supply output terminals T5, T6 are normally open gas supply switch contacts R3A controlled by the gas supply relay winding R3 while normally open contactor switch contacts R4B responsive to the contactor relay winding R4 are connected across the second pair of contactor output terminals T9, T10. Similarly, normally open wire feed switch contacts R5B responsive to the wire feed relay winding R5 are connected across the second pair of wire output terminals T13, T14. Finally, normally open fixture feed switch contacts R6B responsive to the fixture feed relay winding R6 are connected across the second pair of fixture feed output terminals T17, T18.

OPERATION

During initial interconnection of the welding system 11 shown in FIG. 1, either the first pair of gas supply output terminals T3, T4 or the second pair of output gas supply terminals T5, T6 are connected to the gas supply control unit 15 depending upon its particular activation requirements For example, if activation of the gas supply solenoid requires the input of an AC supply, the first pair of output terminals T3, T4 are connected. Conversely, the second pair of output terminals T5, T6, are connected if the unit 15 requires a closed switch for activation. In a similar manner the contactor output terminals T7-T10, the wire feed output terminals T11-T14 and the fixture feed output terminals T15-T18 are appropriately and alternatively connected to the input terminals, respectively, of the welder unit 12, the wire feeder 14, and the work positioner 13.

After closure of the on-off switch S1, a welding cycle is initiated by manual actuation of the momentary switch S3 to energize the start up relay windings R1, R2 and thereby induce closure of contacts R1A, R1B and R2A. Also activated at this time is the gas purge timer TD1. The closed contacts R1A shunt the subsequently released start up switch S3 to maintain energization of the start up relays R1, R2 while the closed contacts R1B energize the gas supply relay winding R3 and apply the supply voltage V across the gas supply output terminals T3, T4. Aocordingly, the energized gas supply winding R3 closes its contacts R3A across the gas supply output terminals T5, T6. Thus, one preselected and connected pair of the gas supply output terminals T3, T4 or T5, T6 provide an appropriate input to the gas supply unit 15 which is thereby activated to induce a discharge of inert gas. However, at this time, the contactor relay winding R4 and the wire feed relay winding R5 remain deenergized and activation of the welder unit 12 and wire feeder 14 are delayed.

After completion of a predetermined time period provided by the gas purge timer TD1, the time delay contacts TD1A close to energize 25 the contactor relay winding R4 via the previously closed contacts R2A and the wire feed relay winding R5 via the previously closed contacts R2B. Energization of the contactor relay winding R4 closes the contacts R4A to provide supply voltage V across the first pair of contactor output terminals T7, T8 and closes the contacts R4B across the second pair of contactor output terminals T9, T10. Similarly, energization of the wire feed relay winding R5 closes the contacts R5A to provide supply voltage V across the first pair of wire feed output terminals S11, T12 and closes contacts R5B across the second pair of output terminals T13, T14. Thus, the appropriate preselected inputs required to activate both the welder unit 12 and the wire feeder 14 are applied and the welding process is initiated. At this time, the weld timer TD2 in the process timer circuit 23 is also energized and after a preselected fixed period times out to open the normally closed contacts TD2A and thereby interrupt the welding process.

In applications requiring automatic feed of a workpiece, the work positioner 13 is activated by closure of the fixture feed on-off switch S6 prior to initiation of the welding operation. The resultant energization of the fixture feed relay winding R6 closes its contacts R6A to apply supply voltage V across the first pair of fixture feed output terminals T15, T16 and closes its contacts R6B across the second pair of fixture feed output terminals T17, T18. Thus, the previously selected fixture feed activation input is applied to the work positioner 13. Depending upon the position of the manually operated fixture feed switch S8, the work positioner 13 can be provided with either a running or a standing start. With the contacts 26 closed, the fixture feed relay winding R6 is energized and deenergized simultaneously with the gas supply relay winding R3 resulting in a running start of the work positioner 13. Conversely, movement of the switch S8 to produce closure of the contacts 27 results in energization and deenergization of the fixture feed relay winding R6 simultaneously with the contactor relay winding R4 and the wire feed relay winding R5 resulting in a standing start of the work positioner 13. In addition, selective manual positioning of a workpiece can be accomplished by operation of the fixture jog momentary switch S5 to open the contacts 24 and close the contacts 25 thereby connecting the fixture feed relay winding R6 directly between the input terminal T2 and the supply terminal TS.

When a burn back function is desired to consume any remnant welding wire remaining after a given welding cycle, the burn back switch S7 is manually closed prior to the initiation of the welding process. After the fixed period provided by the weld timer TD2, its contacts TD2B are closed to activate the burn back timer TD3 and close its contacts TD3A. Closure of the contacts TD3A maintains energization of the contactor relay winding R4 to retain welding voltage on the welding electrode of the welder unit 12 and thereby consume any remnant welding wire. After the predetermined time provided by the burn back timer TD3, its contacts TD3A again open to deenergize the contactor relay winding R4 and deactivate the welder unit 12

In the event that selective independent control of wire feeder 14 is desired, the wire feed switch S4 can be manipulated to selectively connect the wire feed relay winding R5 between the input terminal T2 and the supply terminal TS. The resultant energization of the wire feed relay winding R5 results in selective activation of the wire feeder 14 as desired. Similarly, independent and selective control of a gas supply purge period can be obtained by manually holding the momentary purge switch S9 closed for the desired purge period. The closed switch S9 connects the gas supply relay R3 between the input terminal T2 and the supply terminal to activate the gas supply unit 15 as described above.

Obviously, many modifications and variations of the present invention are possible in light of the above teachings. It is to be understood, therefore, that the invention can be practiced otherwise than as specifically described.

What is claimed is:
1. A welding control system comprising:
first and second pairs of gas supply output terminals;
a gas supply connected to a selected one of said first and second pairs of gas supply output terminals;
first and second pairs of contactor output terminals;
a welder unit connected to a selected one of said first and second pairs of contactor output terminals;
first and second pairs of wire feed output terminals;
a wire feeder connected to a selected one of said first and second pairs of wire feed output terminals;
normally open gas supply switch contacts connected across said second pair of gas supply output terminals;
normally open contactor switch contacts connected across said second pair of contactor output terminals;
normally open wire feed switch contacts connected across said second pair of wire feed output terminals;

input terminals for connection to a voltage supply; and control circuit means for selectively connecting said input terminals across said first pairs of output terminals, and for selectively closing said normally open switch contacts.

2. A control system according to claim 1 wherein said control circuit means comprises gas supply relay means energizable to both connect said input terminals across said first pair of gas supply output terminals and to close said normally open gas supply contacts, contactor relay means energizable to both connect said input terminals across said first pair of contactor output terminals, and to close said normally open contactor contacts, and wire feed relay means energizable to both connect said input terminals across said first pair of wire feed output terminals and to close said normally open wire feed contacts.

3. A control system according to claim 2 wherein said control circuit means further comprises activatable start-up means for energizing said relay means, and purge timer means for delaying energization of said contactor and wire feed relay means for a predetermined period after energization of said gas supply relay means.

4. A control system according to claim 3 wherein said control circuit means further comprises process timer means for automatically deenergizing said relay means within a given period after activation of said start-up means.

5. A control system according to claim 4 wherein said process timer means deenergizes said gas supply and wire feed relay means prior to deenergizing said contactor relay means.

6. A control system according to claim 5 wherein said process timer means comprises weld timer means for deenergizing said gas supply and wire feed relay means a fixed period after activation of said start-up means, and burn-back timer means for maintaining energization of said contactor relay for a limited period after deenergization of said gas supply and wire feed relay means.

7. A control system according to claim 6 wherein said control circuit means further comprises manually operated wire feed switch means for selectively energizing said wire feed relay means.

8. A control system according to claim 7 wherein said control circuit means comprises manually operated purge switch means for selectively energizing said gas supply relay means.

9. A control system according to claim 8 wherein said control circuit means further comprises manually operated burn-back switch means for selectively deactivating said burn-back timer means.

10. A control system according to claim 9 wherein said control system further comprises first and second pairs of fixture feed output terminals and normally open fixture feed switch contacts connected across said second pair of fixture feed output terminals, and said control circuit selectively connects said input terminals across said first pair of fixture feed output terminals and closes said fixture feed switch contacts.

11. A control system according to claim 10 wherein said control circuit further comprises fixture feed relay means energizable to both connect said input terminals across said first pair of fixture feed output terminals and to close said fixture feed switch contacts.

12. A control system according to claim 11 wherein said control circuit means further comprises manually operated fixture feed switch means for selectively energizing and deenergizing said fixture feed relay means simultaneously with said wire feed and contactor relay means.

13. A control system according to claim 11 wherein said control circuit further comprises manually operated fixture feed switch means for selectively energizing and deenergizing said fixture feed relay means simultaneously with said gas supply relay means.

14. A control system according to claim 2 wherein said control system further comprises first and second pairs of fixture feed output terminals and normally open fixture feed switch contacts connected across said second pair of fixture feed output terminals, and said control circuit selectively connects said input terminals across said first pair of fixture feed output terminals and closes said fixture feed switch contacts.

15. A control system according to claim 14 wherein said control cirucit further comprises fixture feed relay means energizable to both connect said input terminals across said first pair of fixture feed output terminals and to close said fixture feed switch contacts.

16. A control system according to claim 15 wherein said control circuit means further comprises activatable start-up means for energizing said relay means, and purge timer means for delaying energization of said contactor and wire feed relay means for a predetermined period after energization of said gas supply relay means.

17. A control system according to claim 16 wherein said control circuit means further comprises process timer means for automatically deenergizing said relay means within a given period after activation of said start-up means.

18. A control system according to claim 17 wherein said control circuit means further comprises manually operated fixture feed switch means for selectively energizing and deenergizing said fixture feed relay means simultaneously with said wire feed and contactor relay means.

19. A control system according to claim 17 wherein said control circuit further comprises manually operated fixture feed switch means for selectively energizing and deenergizing said fixture feed relay means simultaneously with said gas supply relay means.

* * * * *